United States Patent

[11] 3,553,487

[72] Inventor John C. Freeborn
West Covina, Calif.
[21] Appl. No. 674,928
[22] Filed Oct. 12, 1967
[45] Patented Jan. 5, 1971
[73] Assignee Honeywell Inc.
Minneapolis, Minn.
a corporation of Delaware

[54] CIRCUIT FOR GENERATING DISCONTINUOUS FUNCTIONS
7 Claims, 2 Drawing Figs.

[52] U.S. Cl. 307/229, 307/235, 307/264, 307/318
[51] Int. Cl. G06g 7/12, H03k 5/20
[50] Field of Search 307/229, 230, 235, 237, 264, 318; 328/142; 235/150.53, 197

[56] References Cited
UNITED STATES PATENTS

| | | | |
|---|---|---|---|
| 3,041,469 | 6/1962 | Ross | 307/235 |
| 3,099,000 | 7/1963 | Dunning | 307/235X |
| 3,173,024 | 3/1965 | Peretz | 307/318X |
| 3,244,910 | 4/1966 | Leifer | 307/318X |

*Primary Examiner*—Donald D. Forrer
*Assistant Examiner*—John Zazworsky
*Attorneys*—Charles J. Ungemach and Ronald F. Reiling

ABSTRACT: A multiple output voltage selective circuit wherein an individual output will follow a predetermined curve with respect to a continuously changing input voltage and wherein each of the output voltages may vary completely independently of the remaining output voltages.

INVENTOR.
JOHN C. FREEBORN
BY Bruce C Lutz
ATTORNEY

CIRCUIT FOR GENERATING DISCONTINUOUS FUNCTIONS

THE INVENTION

The present invention is generally related to electronics and more specifically to a function generator which is designed such that it can be connected with a plurality of other identical function generators to produce a plurality of substantially independent outputs each of which may be voltage selective in its output with respect to the input and each of which produces an output which may be a variable function of the input.

While there are many function generators in the prior art, it is believed that the present invention is simpler and cheaper to construct. In operation an input signal is passed from input to output until a predetermined amplitude is reached. The input signal is also passed through a zener diode or other voltage selective circuit to the input of an inverting amplifier which is also connected to the output. At the predetermined amplitude, the inverting amplifier takes over control of the circuit and alters the rate of change of the output signal with respect to the input signal. The new rate of change of the output signal may have either a positive or negative slope with respect to the slope of the input signal. The circuit, further, is very versatile in that the predetermined voltage may be easily adjustable. The rate of change may also be easily adjusted without altering other circuit components.

As disclosed a plurality of these circuits are connected together to provide a function generator which produces a plurality of output signals wherein the output signals may or may not be symmetrical, and further, may or may not overlap depending upon the desired application of the function generator.

It is therefore an object of this invention to provide an improved function generator.

Other objects and advantages of this invention will be apparent from a reading of this specification and appended claims in conjunction with the drawings wherein:

Figure 1:
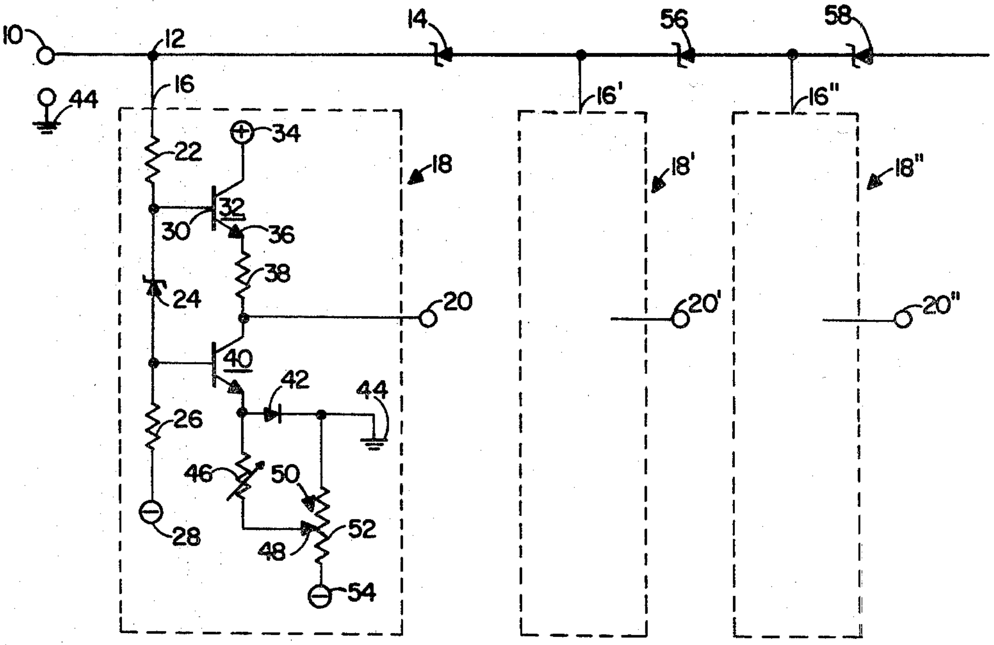
FIG. 1 is a schematic diagram of one embodiment of the invention.

In FIG. 1 an input terminal 10 is connected to a junction point 12 which, in turn, is connected to a cathode of a zener diode 14, and also to an input 16 of a circuit block generally designated as 18. Block 18 is one of a plurality of function generators or voltage selective circuits. Each of the remaining circuits, which may be constructed in a fashion identical to that of 18, are labeled where pertinent with the same number as block 18 and one or more primes. Accordingly, as shown in FIG. 1, there are blocks 18′ and 18″. Block 18 has an output terminal generally designated as 20. Within block 18, terminal 16 is connected to a negative potential or power supply 28 through a series connection of a resistor 22, a voltage reference means, voltage selective means or zener diode 24, and a resistor 26. The resistor 22 is connected to the cathode of diode 24. The junction between resistor 22 and diode 24 is connected to a base 30 of an NPN transistor generally designated as 32 having a collector connected to a positive potential or power supply 34 and an emitter 36 connected through a resistor 38 to output terminal 20. A second NPN transistor 40 has a base connected to a junction between diode 24 and resistor 26 and a collector connected to output terminal 20. Further, transistor 40 has an emitter connected through a diode 42 to ground or reference potential 44. The emitter of transistor 40 is also connected through a variable resistor 46 to a wiper 48 of a potentiometer generally designated as 50 having a resistance element 52. Resistance element 52 is connected between ground 44 and a negative power supply 54 which may be the same as negative supply 28. The emitter of transistor 40 is connected to the anode of diode 42 so that the direction of easy current flow is toward ground. Input 16′ of block 18′ is connected to the anode of zener diode 14, and is also connected to a cathode of a further zener diode 56 which has its anode connected to an input 16″ of block 18″. The input 16″ is also connected to a cathode of a zener diode 58. The anode of diode 58 is connected to an input of a further block (not shown). As many additional blocks similar to block 18 may be added as are required for the particular application in which the function generator is used.

Figure 2:
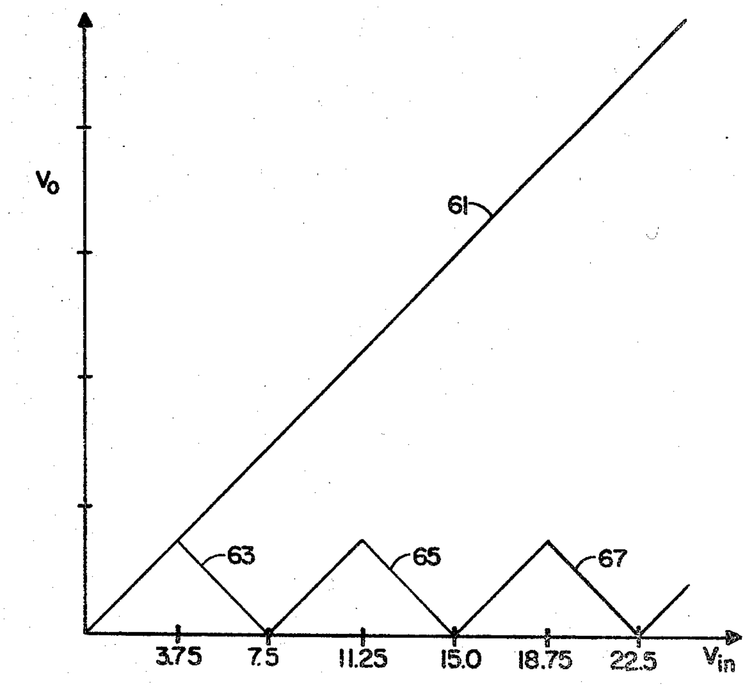
FIG. 2 is a graph illustrating the output signals obtained from FIG. 1 in one possible setting of this circuit.

Referring to FIG. 2, an increasing input potential designated as 61 is plotted against the increasing voltages on the abscissa. The output voltages are plotted as ordinate potentials. A first triangular-shaped output is designated as 63. This triangular output originates at zero potential, has a peak at 3.75 volts, and reduces to zero at 7.5 volts input. A second curve 65 originates at 7.5 volts, has a peak at 11.25 volts and reduces to zero at 15 volts. A third curve 67 originates at 15 volts has a peak at 18.75 volts and diminishes to zero at 22.5 volts. The curve 63, 65 and 67 are indicative respectively of the outputs obtained at outputs 20, 20′ and 20″ of the various blocks 18.

For the purposes of explanation of this circuit it will be assumed that all of the zener diodes have 7½-volt breakdown voltages. This number is chosen because one embodiment of the invention utilized 7½-volt zener diodes, and because it allows a simple explanation of the operation of this circuit. However, as will be realized, other values of zener diodes may be used for providing different value symmetrical outputs or alternatively different values of zener diodes may be mixed for providing unsymmetrical outputs.

To produce the output shown in FIG. 2 from the circuit of FIG. 1, wiper 48 is adjusted to produce a potential at the emitter of transistor 40 which is negative 3.75 volts. The variable resistor 46 is then adjusted such that the effective resistance between emitter 40 and supply 54 is one-half the resistance of resistor 38. In one embodiment of the invention the power supply 28 was negative 15 volts so that the zener diode is always conducting the reverse direction even when the input is grounded. Resistor 22 is a low impedance resistor to prevent excessive loading of the input at high positive input signals. Since its impedance is low relative to other impedances in the circuit, the effect of this resistor will be neglected, or at least not considered in further explanations of the circuit. Resistor 26 is a high impedance resistor utilized to provide a current path through zener diode 24 to keep it in its reverse conducting condition.

When a positive input potential with respect to ground 44 is applied to input 10 transistor 32 starts conducting. Since transistor 32 is connected in an emitter follower condition, the output voltage at terminal 20 will raise at substantially the same rate as the input in the absence of a low impedance load. Since the base of transistor 40 is kept 7½-volts negative with respect to the base of transistor 32, transistor 40 will not conduct until its base is positive with respect to the emitter which as previously indicated was set at −3.75 volts. When the input potential reaches positive 3.75 volts, the base of transistor 40 is at the emitter potential of transistor 40. Therefore, any further increases in input potential will start transistor 40 conducting. Transistor 32 will remain in an ON condition, however, transistor 40 will take over control since its emitter resistance is one-half its collector resistance. Therefore, there will be a voltage gain within transistor 40 and the collector will drop in potential as the input potential rises. This is shown as the curve between 3.75 and 7.5 volts in FIG. 2. At 7.5 volts, the transistor 40 is fully conducting and the output will remain at substantially ground potential until the input is reduced below 7.5 volts.

Since zener diode 14 is a 7.5-volt zener diode, and a diode 24′ within 18′ is connected to a −15-volt supply, there will be not current flowing therethrough to circuit 18′ until the potential applied at terminal 10 is greater than 7.5 volts. At approximately 7.6 volts current will flow therethrough and the output terminal 20′ will rise in a manner similar to that of circuit 18. The emitter of the lower transistor 40′ within circuit 18′ would be set to negative 3.75 volts the same as in circuit 18.

This is possible since the zener diode 14 will act in cooperation with the diode 24' within 18'. Thus, the transistor 40' will not conduct until 11.25 volts input signal amplitude is applied since the base will not rise to −3.75 volts until the input potential reaches 11.25 volts. The same general description applies to the remaining blocks 18.

While the circuit has been described using identical circuits set in an identical fashion for providing symmetrical outputs, it is to be realized that by adjustment of the wiper 48 on potentiometer 50, the conducting voltage of transistor 40 may be varied. This conducting voltage may also be varied by substitution of different zener diode values for zener diodes 24, 14, 56 and 58. Further, the slope of the curve after transistor 40 starts conducting can be varied by adjustment of variable resistor 46. Thus, the slope of the output obtained after conduction of transistor 40 may be varied anywhere between a slope equal to that of the input signal and a very steep negative slope curve.

As will be further realized, by the adjustment of diodes 14, etc. the various curves such as 63 and 65 can be made to overlap. In fact, the elimination of diode 14 will allow curves 63 and 65 to overlap symmetrically.

This circuit was originally designed to provide an output to each one of a plurality of circuits as the input voltage changed in an analogue manner. In other words, it was desired that between 0 and 7.5 volts a particular circuit received a signal while between 7.5 and 15 volts a second circuit received the input signal. In the same manner it was desired that a third circuit receive a signal when the input potential was between 15 and 22.5 volts. However, as will be realized by those skilled in the art, this circuit may be used as a function generator and may be modified in many different ways to produce the desired output. Further, one of the blocks 18 may be utilized alone to produce a particular shape output with a given input signal.

While a particular embodiment has been shown and described it is to be realized that I wish to be limited not by the specification and drawings but only by the scope of the appended claims.

I claim:

1. A circuit for generating an electrical output signal as a predetermined function of an input signal comprising:

first and second transistors of like conductivity types, each having a base and first and second corresponding electrodes;

voltage reference means connected between the bases of said first and second transistors for continuously maintaining a fixed voltage therebetween;

input means for supplying an input signal to the base of said first transistor;

impedance means connecting the first electrode of said first transistor to the second electrode of said second transistor;

a reference source for supplying a reference potential;

supply means for supplying a first potential different from the reference potential;

first means connecting said supply means to the second electrode of said first transistor for supplying the first potential thereto;

second means for connecting the first electrode of said second transistor to said reference source; and signal output means connected to the second electrode of said second transistor for supplying the output signal of the circuit.

2. The circuit of claim 1 further including at least one additional circuit in accordance with claim 1 and voltage sensitive means connecting the input means of the circuits in series, said voltage sensitive means supplying a signal to said additional circuit only when the input signal to the first-named circuit exceeds a predetermined magnitude.

3. The circuit of claim 1 wherein said second connecting means includes adjustable means for maintaining the first electrode of said second transistor at a selected potential different from the reference potential when said second transistor is nonconducting.

4. The circuit of claim 3 wherein:

said supply means further supplies a second potential different from the reference potential and of opposite polarity with respect thereto than the first potential; and said second connecting means includes adjustable impedance means connecting said supply means and the first electrode of said second transistor for supplying a potential less than the reference potential thereto, said impedance means and said second connecting means determining the amplification provided by said second transistor.

5. A function generator for generating an electrical output signal as a predetermined function of an input signal comprising:

first and second NPN transistors, each having a base, an emitter and a collector;

impedance means connecting the emitter of said first transistor to the collector of said second transistor;

voltage reference means connected between the bases of said first and second transistors and operable to maintain the base of the first transistor at a fixed positive voltage with respect to the base of said second transistor;

input means connected to supply an input to the base of said first transistor;

a reference source for supplying a reverence potential;

supply means for supplying a first potential greater than the reference potential;

first means connecting the supply means to the collector of said first transistor;

second means connecting the emitter of said second transistor to said reference source; and output signal means connected to the collector of said second transistor.

6. The function generator of claim 5 wherein said second connecting means includes means for maintaining the emitter of said second transistor at a predetermined potential when said second transistor is nonconducting.

7. The function generator of claim 6 wherein:

said supply means also supplies a second potential of less than the reference potential;

said second connecting means comprises resistance means connecting said supply means to the emitter of said second transistor for maintaining a fixed potential less than the reference potential at the emitter of said second transistor; and diode means is provided having its anode connected to the emitter of the second transistor and having its cathode connected to said reference source.